Figure 1:
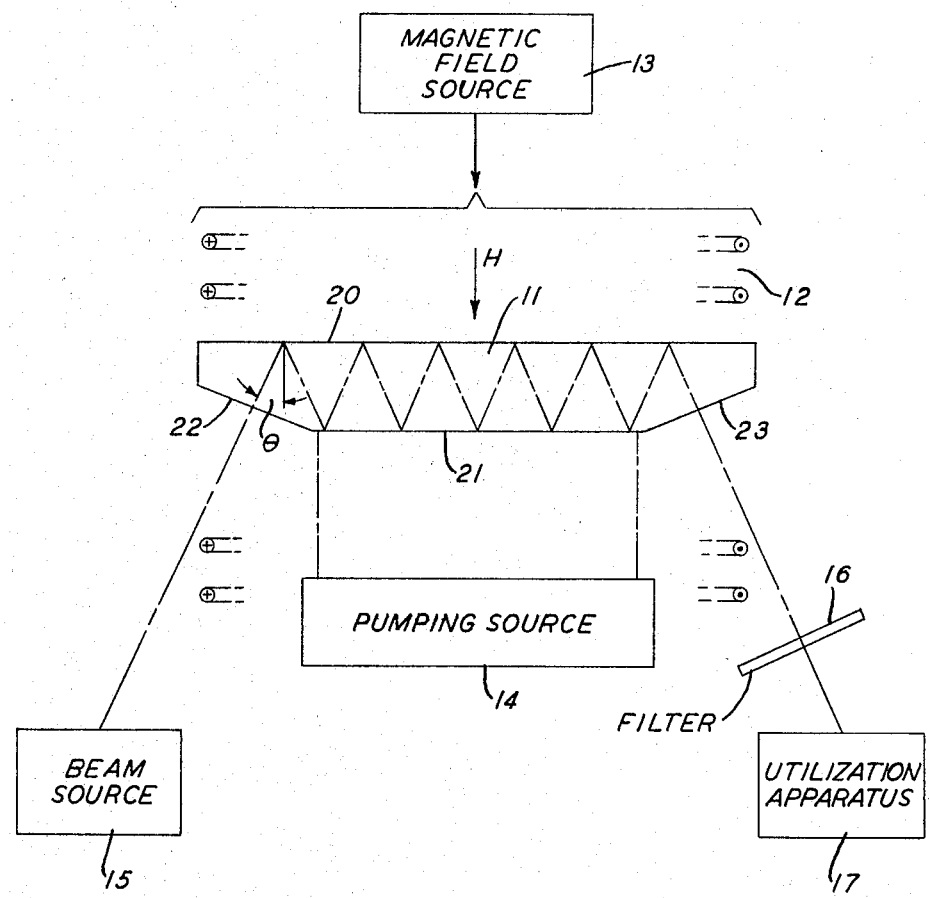

Aug. 9, 1966     P. A. WOLFF     3,265,977
CYCLOTRON RESONANCE LASER

Filed March 26, 1965     2 Sheets-Sheet 1

INVENTOR
P. A. WOLFF
BY
Wilford L. Wisner
ATTORNEY

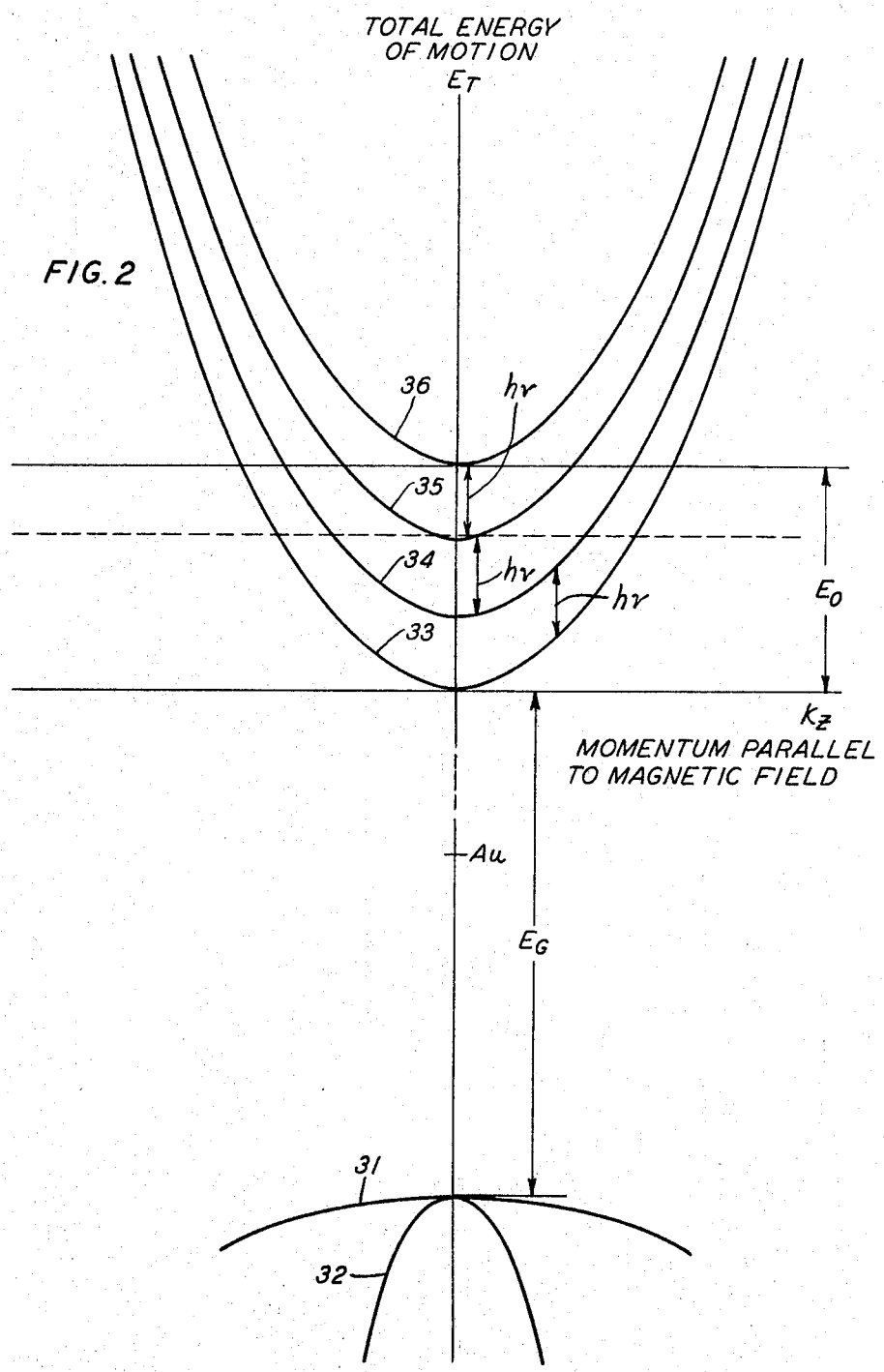

3,265,977
CYCLOTRON RESONANCE LASER
Peter A. Wolff, Berkeley Heights, N.J., assignor to Bell
 Telephone Laboratories Incorporated, New York, N.Y.,
 a corporation of New York
Filed Mar. 26, 1965, Ser. No. 442,918
8 Claims. (Cl. 330—4.3)

This invention relates to apparatus for the stimulated emission of radiation and particularly to cyclotron resonance lasers. Laser is a well-known acronym which stands for light amplification by stimulated emission of radiation. As used in this context, light refers not only to the visible region of the spectrum, but also to extensive regions of the spectrum beyond both limits of the visible.

The rapid development of stimulated emission apparatus included masers operating in the portion of the electromagnetic spectrum that is commonly designated as the microwave portion and lasers operating at wavelengths shorter than $100\mu$, including the visible portion of the spectrum.

This development, nevertheless, left a gap in the electromagnetic spectrum between about $1000\mu$ and about $100\mu$ in which stimulated emission can be achieved at only a few isolated frequencies.

It was recognized that the phenomenon of cyclotron resonance might provide a way to close this gap. The phenomenon of cyclotron resonance occurs when free electrons or electrons in the conduction band of a material are subjected to a magnetic field. The magnetic field forces the electrons to travel in circles or helices having radii of certain discrete values. Moreover, the energy of motion of these electrons in a direction perpendicular to the field is now quantized; that is, their motions perpendicular to the field can be altered only in steps of energy. These steps are more accurately called cyclotron energy levels. The energy difference of adjacent levels is proportional to the strength of the magnetic field.

The promise of this phenomenon stems from the fact that the wavelength of a stimulated emission depends upon the difference of two energy levels available in the active material. Thus, it was hoped that a magnetic field of appropriate strength could be applied to an appropriate material to provide the energy step needed for stimulated emission in the far infrared portion of the spectrum.

Indium antimonide and alloys of bismuth were recognized as appropriate materials for such stimulated emission, but a troublesome problem arose.

To understand this problem, certain background information concerning lasers is necessary. Useful stimulated emission depends upon a predominant population of electrons in the higher of the two energy levels that are being utilized. The predominance of electron population in the higher of the two levels is called a population inversion. Stimulated emission occurs when electrons in the higher level are stimulated to fall to the lower level, the stimulated emission being much more intense than the stimulating radiation because of an avalanche-like effect. A source of energy known as a pumping source usually must be provided to maintain or re-establish the population inversion needed for stimulated emission. This pumping source provides energy in a form that lacks one or more distinctive characteristics that are desired in the stimulated emission.

The basic problem in obtaining stimulated emission radiation from the cyclotron resonance phenomenon was that the stimulated emission resulting from electron transitions from the predominately populated cyclotron energy level to the next lower level would tend to be quickly absorbed by electron transitions from the predominantly populated level to a still higher cyclotron energy level. The number of such higher levels is virtually infinite.

Proposals have been made to solve this problem by eliminating the equal spacing of cyclotron energy levels; but these proposals require excessive amounts of power in relation to the feeble radiation obtainable and require such strong magnetic fields that the resulting stimulated emission has a wavelength in the same range as many existing lasers.

Thus, the search has continued for other ways to inhibit reabsorption of the stimulated emission in a cyclotron resonance laser.

One object of my invention is to provide a cyclotron resonance laser capable of operating at wavelengths between $100\mu$ and $1000\mu$.

According to my invention, an active material appropriate for a cyclotron resonance laser is pumped with energy in an appropriate band to populate selectively the cyclotron energy level that is immediately below the energy level of the optic phonon. The optic phonon is a crystal lattice vibration readily excited by a collision process involving electrons having energies above a particular level called the level of the optic phonon. More broadly, the selectively populated level is disposed below a threshold level above which electrons in the laser crystal predominantly release energy collision. Preferably, the electron population of the selectively populated level predominates over the electron population of the next lower level. It may be said that an inverted electron population is established.

Establishing the inverted electron population immediately below the level of the optic phonon reduces the probability of adsorption of the stimulated emission for physical reasons that are based on Heisenberg's uncertainty principle. One resultant advantage is that pumping power required for a given stimulated emission is drastically reduced as compared to the requirements of prior art proposals. Another advantage is that the strength of the magnetic field can be varied to produce radiations over a wide continuous tuning range including, but not limited to, the far infrared portion of the spectrum between wavelengths of $100\mu$ and $1000\mu$. The radiation can also be extended with continuous tuning to longer wavelengths in the microwave portion of the spectrum and to shorter wavelengths, i.e., $50\mu$ for indium antimonide, in the far infrared portion of the spectrum. The shortest wavelength is in any case determined by that spacing of cyclotron energy levels which is the largest spacing that permits a population inversion below the level of the optic phonon. The longest attainable wavelength is determined primarily by the narrowness of the pumping energy band that is required because of the close spacing of the cyclotron energy levels that produce such a long emitted wavelength.

Other objects, features and advantages of my invention will become apparent from the following detailed description and the drawing, in which:

FIG. 1 is a partially pictorial and partially block diagrammatic illustration of a preferred embodiment of the invention; and FIG. 2 shows curves that are helpful in understanding the theory and operation of the invention.

In FIG. 1, the preferred embodiment of the invention comprises a crystal 11, such as indium antimonide (InSb), which is disposed centrally within a coil 12 of conducting material. A magnetic field source 13 is connected to coil 12 to supply a current therethrough, which generates a magnetic field, H, perpendicular to the major surfaces 20 and 21 of crystal 11. A pumping source 14 is disposed to direct radiant energy over the entire major face 21 of the crystal 11. A source 15 directs a weak beam of radiation to be amplified upon the minor face 22 of the crystal 11. A filter 16, preferably an intrinsic crystal of the same type of material as crystal 11, is disposed outside the magnetic field and intercepts the stimulated radiation emitted through the minor face 23 of crystal 11 to eliminate pumping light and radiation frequencies generated by the crystal 11 independently of cyclotron resonance; and utilization apparatus 17 intercepts the radiation transmitted by filter 16.

The crystal 11, more specifically, can comprise p-type InSb, or InSb including an acceptor impurity at least in sufficient quantities to compensate the crystal fully with respect to any donor impurities therein. In either case, the acceptor impurity is preferably gold or silver. As a result, electrons appear in the conduction band primarily in response to pumping source 14. If any other acceptor impurity is used, care should be taken to see that the acceptor impurity level is disposed in the bandgap as described hereinafter in connection with FIG. 2.

The crystal 11 might also comprise gallium arsenide, indium arsenide, indium phosphide, gallium antimonide, alloys of bismuth and antimony including 5–20 percent of antimony, or the $Cd_xHg_{(1-x)}Te$ or $HgTe_{(1-x)}Se_x$ alloys, respectively disclosed in the article by Harman et al., Physical Review Letters, vol. 7, p. 403, 1961 and in the article by Rodot et al., Journal of Applied Physics, Supplement to vol. 32, p. 2254, October 1961. Other direct-band-gap III–V semiconductors, i.e., those in which the bandgap transition occurs without change in momentum, could also be used. The specific materials mentioned have optic phonons at energy levels not far from the level of the optic phonon in InSb, although the generally greater effective masses of their conduction band electrons require the application of relatively stronger magnetic fields.

In any event, desirable materials for cyclotron resonance masers are characterized in that the effective mass of an electron in the material is less than the mass of a free electron, preferably at least an order of magnitude less.

The crystal 11 has the parallel major faces 20 and 21 and the minor faces 22 and 23, which may be partially silvered or made partially reflective in direct relation to the gain desired. Minor faces 22 and 23 are disposed with their surface normals forming an angle, $\theta$, equal to about fifteen degrees in the case of indium antimonide, with respect to the surface normals of the major surfaces 20 and 21. This angle should be larger than the angle needed for total internal reflection but is preferably as small as possible to allow the direction of the light from source 15 to be as nearly parallel to the magnetic field as possible.

Coil 12 is an induction coil or a Helmholz coil wound to provide a uniform magnetic field within crystal 11. A Helmholz coil comprises two separate windings spaced at a distance equal to the coil radius. They may be connected in series or in parallel. Coil 12 is oriented so that the magnetic field, H, is perpendicular to the major surfaces 20 and 21 of crystal 11. The strength of the magnetic field generated in response to source 13 lies in a range described hereinafter in connection with FIG. 2. In the case of indium antimonide, its value may range from 1.5 kilogauss for an emitted wavelength of $1000\mu$ to 30 kilogauss for an emitted wavelength of $50\mu$. The frequency of stimulated radiation from crystal 11 is directly proportional to the strength of the magnetic field.

Beam source 15 comprises a source of far infrared radiation, for example, a weak natural source that can be specifically identified as to location and direction, a source of nonspecific background noise at the desired frequency, in which case the apparatus is adapted to run as an oscillator, or a man-made source or previous stage of amplification of the desired radiation.

Filter 16, while preferably of the same material as crystal 11, may be any device for removing undesired components of the emitted radiation.

Utilization apparatus 17 is adapted to utilize the emitted radiation. For example, it might comprise communication apparatus such as modulators, detectors, et cetera, or it might be a sample of a material that is being tested for its response to far infrared radiation.

Pumping source 14 may be an indium antimonide or gallium antimonide junction laser, or a junction laser using a mixture of InSb and GaSb to provide a pumping energy in the range 0.251 electron volt to 0.269 electron volt if crystal 11 is InSb. These energies correspond to wavelengths of $4.94\mu$ and $4.60\mu$, respectively. A preferred junction laser for source 14 comprises 75 percent InSb and 25 percent GaSb, and is operated as disclosed in the article by R. J. Phelan et al., in Applied Physics Letters, volume 3, p. 143 (1963).

In general, regardless of the material of crystal 11, a suitable pumping source 14 will be available, since source 14 operates in the near infrared portion of the spectrum at much shorter wavelengths than those which it is desired to obtain from crystal 11.

In operation, source 14 selectively populates a cyclotron energy level next below the level of the optic phonon; and magnetic field source 13 tunes the maser, since the strength of the magnetic field determines what particular frequency of radiation from beam source 15 will stimulate a more intense radiation of the same frequency emitted through minor surface 23 toward filter 16 and utilization apparatus 17.

A beam of appropriate frequency from source 15 will be amplified linearly with respect to intensity if the reflectivity of minor surfaces 22 and 23 is sufficiently low, or, in other words if their transmissivity is sufficiently high.

Increased reflectivity of minor surfaces 23 and 22 will tend to raise the gain of the laser. When the gain is high enough, stimulated emission will occur in response to background levels or noise levels of far infrared radiation. Thus, no particular source 15 is needed; and the apparatus of FIG. 1 operates essentially as an oscillator.

The theory and operation of the invention may best be understood by referring to FIG. 2, in which curves 31–36 describe several states of motion permitted electrons within crystal 11 as subject to the magnetic field provided by coil 12.

In FIG. 2, the vertical coordinate of a point represents the total energy of motion of an electron, and the horizontal coordinate of the same point represents the momentum of the electron in a direction parallel to the magnetic field.

Thus, an electron represented by a point on the vertical axis has no component of motion parallel to field and, if moving at all, moves in a fixed circle, a cyclotron orbit, perpendicular to the field. An electron represented by a point on curve 33 has the smallest possible amount of motion perpendicular to the field and moves parallel to the field with a momentum equal to the horizontal coordinate. An electron with both components of motion moves in a helix having an axis parallel to the field and having a radius that is a discrete or quantized value permitted by the strength of the field. This radius is the same as the radius of the cyclotron orbit that the electron would occupy if not moving parallel to the field.

The valence band of the material lies below curve 31, and the conduction band of the material lies above curve 33. The minimum energy difference between them is called the energy gap, $E_g$.

The principal electrons of interest in the valence band of the material exist in states described by curves 31 and 32. These electrons, when driven into the conduction band, leave behind vacancies or "holes." The set of states described by curve 31 is sometimes called the "heavy hole band" and the set of states described by curve 32 is sometimes called the "light hole band." Most of the electrons utilized in apparatus according to my invention are excited from the heavy hole band, i.e., that depicted by curve 31.

In order to arrive in the conduction band, the electrons must be supplied with sufficient energy to jump the energy gap, which is labeled $E_g$ in FIG. 1. It is noted that $E_g$ is slightly larger with a magnetic field applied to the crystal than without a magnetic field applied to the crystal.

According to the invention, the electrons are also supplied with an additional increment of energy that is sufficient to cause them to populate predominately the energy level, or set of states on a curve, next below the level $E_o$ at which they could excite the crystalline lattice vibration known as the optic phonon.

In FIG. 2 this predominately populated cyclotron energy level is depicted by curve 35. Only that portion of curve 35 below the level $E_o$ represents the excited electrons. This portion of curve 35 is a single energy level in the sense that each of the electrons represented thereby has the same component of energy perpendicular to the field, that is, the energy represented by the vertex of curve 35.

The electrons are excited to the cyclotron energy level depicted by curve 35 by photons from pumping source 14, each photon having a photon energy between $$(E_g + nE_o - h\nu)$$

and $(E_g + nE_o)$, where $n$ is a positive integer, $h$ is Planck's constant, and $\nu$ is the frequency emitted when an electron falls from one level to another.

The portion of the energy represented by $(n-1) \cdot E_o$ is lost almost immediately (in a time of the order of $10^{-13}$ seconds) by exciting the crystalline lattice vibration known as the optic phonon. The electrons will then be represented, predominately or most probably, by points on curve 35.

It is important that electrons, once in the set of states described by curve 35, remain in that set of states throughout their lifetime. To this end, the crystal 11 should be kept cold, preferably about 4 degrees Kelvin. Also, the acceptor impurity level should be disposed in the bandgap so that it is not possible for electrons having energies $E_o$ or less in the conduction band to excite electrons from the valence band to the acceptor level by collision. Gold or silver as an acceptor compensating indium antimonide satisfies this condition. Some electrons will have such great momentum parallel to the field that they are not in the energy level represented by curve 35. These electrons are excited to the levels represented by the portions of curves 33 and 34 between the level of the optic phonon and an energy $h \cdot \nu$ below the level of the optic phonon.

Use of photon pumping energy from source 14 such that $n$ is greater than unity has the advantage that additional electrons from the level represented by curve 32 can be raised to the level of curve 35, although additional pumping power is required. Electrons excited from the level represented by curve 32 will lose a lesser portion of the pumping photon energy as compared to electrons excited from the level represented by curve 31.

A population inversion has now been established in crystal 11, and the conditions for maser action have been satisfied. That is, the population of electrons on the energy level represented by curve 35 now predominates over the population of electrons on the next lower energy level represented by curve 34. Even faint radiation from the source 15 with a photon energy $h \cdot \nu$ is now sufficient to trigger great numbers of electron transitions from the level of curve 35 to the level of curve 34, thereby releasing additional photons having energy $h \cdot \nu$. These photons are reinforced by stimulated emissions attributable to multiple reflections of the beam in crystal 11, and the reinforced stimulated emission finally is transmitted through minor face 23. If minor faces 22 and 23 are partially reflective, the multiple reflections can include several traverses of the indicated path. The coupling between the stimulating beam from souce 15 and the inverted electron population depends primarily upon the component of the beam parallel to the magnetic field. Some additional gain is produced by transitions from states represented by curve 34 to states represented by curve 33.

It is noted that curves 34, 35 and 36 are substantially parabolas with substantially equal spacing throughout. Thus, it might appear that the stimulated emission produced in transitions from curve 35 to curve 34 would be absorbed by other electrons, which would then make a transition to a higher energy level.

The probability of such a transition is made substantially smaller than the probability of the described downward transition by the disposition of the optic phonon. Since such a crystalline lattice vibration is excited by electron collisions, it provides a relatively broader absorption line than the emission line of the downward transition. Since the absorption line is broader, an electron on the level of curve 35 can absorb a broader range of energies to rise to a level to excite the phonon. It follows from quantum mechanics that the probability of the upward transition is a constant equal to the sum of the respective probabilities of the upward transition in response to differing frequencies. Consequently, the probability of upward transitions excited by the narrow band stimulated emission is substantially reduced as compared to a situation in which the selectively populated level and the next higher cyclotron energy level are not separated by the optic phonon.

The result of this effect of the optic phonon when the inverted population is disposed with respect to it according to the invention is that a useful stimulated emission can be maintained at practical pumping power from source 14.

It is noted that the pumping power could be still further reduced by increasing the magnetic field until curve 35 is entirely above the level of the optic phonon. Source 14 will now establish the inverted population on the level of curve 34. The source 14 can still supply the same photon energy; but that photon energy could also be somewhat lower because of the increased spacing between the cyclotron energy (represented by the curve vertex) of the predominately populated level and the level, $E_o$, of the optic phonon. In other words, the permissible frequency band of pumping source 14 is broadened.

The increased spacing of curves 33, 34 and 35 increases the photon energy and frequency of the stimulated emission and reduces its wavelength.

The strength of the magnetic field can be increased from the strength for which the vertex of curve 35 lies just above the level, $E_o$, still further until the vertex of curve 34 is just below the level, $E_o$, of the optic phonon. The permissible frequency band of pumping source 14 is now narrowed, instead of broadened, and approaches $$\frac{E_g + E_o}{h}$$

It is noted that no further reduction in pumping power accompanies this last range of increase in magnetic field strength. Pumping power is reduced only when another cyclotron energy level is pushed above the level, $E_o$, of the optic phonon.

Conversely, as the strength of the magnetic field is reduced from the strength that produces the energy level configuration shown in FIG. 2, the spacing between curves 33–36 is reduced. Pumping power is increased as additional cyclotron energy levels (e.g. 36) fall below the level, $E_o$, of the optic phonon. The permissible frequency band of pumping source 14 is narrowed. The frequency and photon energy of the stimulated emission radiation fall; and its wavelength increases.

It should be particularly noted that the strength of the magnetic field uniquely determines the frequency of the stimulated radiation emitted. Therefore, the pumping power and pumping bandwidth must be whatever is required in view of the magnetic field strength needed to obtain the desired wavelength of stimulated radiation.

For operation at a $1000\mu$ wavelength of stimulated emission radiation in InSb, the strength of the magnetic field should be about 1.5 kilogauss; and the wavelength of pumping source 14 should preferably be between $4.78\mu$ and $4.80\mu$, or, alternatively, a shorter wavelength corresponding to a pumping photon energy between $$(0.234+0.024 \cdot n)$$

electron volts and $(0.235+0.024 \cdot n)$ electron volts. For these shorter wavelengths, the positive integer, $n$, is greater than unity.

For operation at a $100\mu$ wavelength of stimulated emission radiation, the strength of the magnetic field should be 15 kilogauss; and the wavelength of pumping source 14 should preferably be between $4.71\mu$ and $4.94\mu$, or alternatively a shorter wavelength corresponding to a pumping photon energy between $(0.227+0.024 \cdot n)$ electron volts and $(0.239+0.024 \cdot n)$ electron volts, the positive integer, $n$, being greater than unity.

For operation at a $50\mu$ wavelength of stimulated emission radiation, the strength of the magnetic field should be 30 kilogauss; and the photon energy of source 14 should preferably be $4.60\mu$, or alternatively, a shorter wavelength corresponding to a pumping photon energy of $(0.245+0.024 \cdot n)$ electron volts, the positive integer, $n$, being greater than unity.

Various modifications of the preferred embodiments are possible, according to the basic principles of my invention. For example, the optic phonon is not the only mechanism which provides a threshold for electron energy release by collision. The electron-acceptor collision process also has an energy threshold above which it is possible to lose energy to the acceptor. By appropriate choice of a different acceptor than that hereinbefore proposed for compensation, it would be possible to dispose the acceptor level in the bandgap so that it lies above the valence band by an amount less than $E_o$, the energy of the optic phonon. The new threshold thus provided is less than the threshold provided by the optic phonon. Gold or silver in indium antimonide do not satisfy this condition, and thus would be replaced by another impurity having an acceptor level lower within the bandgap. This acceptor should provide an energy level lying less than 0.024 electron volt above the edge of the valence band, i.e., above curve 31. The collision rate for electrons having energies above this threshold should be larger than the background collision scattering rate of the material.

This phenomenon could possibly enable practice of the invention in silicon or germanium, since in these materials the background electron collision rates can be made small more easily than in indium antimonide.

A more theoretical explanation of my invention may be found in my article "Proposal for a Cyclotron Resonance Maser in InSb," Physics, volume 1, No. 3, pp. 147–157, November–December 1964.

What is claimed is:

1. Apparatus for the stimulated emission of radiation, comprising a crystal of material in which electrons have an effective mass less than the mass of a free electron and in which electrons having energies above the threshold level of a crystalline lattice vibration predominately release energy by collision, means for supplying below the level of said lattice vibration at least two cyclotron energy levels between the upper two of which a population inversion can be established, and means for applying to said crystal energy that selectively populates the cyclotron energy level next below said threshold level to establish said population inversion, whereby electrons of the selectively populated level predominately release energy by stimulated radiation.

2. Apparatus for the stimulated emission of radiation, comprising a crystal of material in which electrons have an effective mass less than the mass of a free electron and in which a crystalline lattice vibration occurs in response to electrons having energies above a threshold level in the conduction band, means for applying a magnetic field to said crystal to provide a plurality of cyclotron energy levels below said threshold level, and means for applying to said crystal energy that selectively populates the one of said plurality of levels that is next below said threshold level to establish a population inversion between the selectively populated level and the next lower cyclotron energy level.

3. Apparatus for the stimulated emission of radiation, comprising a crystal of indium antimonide, means for applying to said crystal a magnetic field providing a plurality of cyclotron energy levels in the conduction band below the threshold level of a crystalline lattice vibration, and means for applying to said crystal radiation that selectively populates the one of said plurality of levels that is next below said threshold level to establish a population inversion between the selectively populated level and the next lower cyclotron energy level.

4. Apparatus for the stimulated emission of radiation comprising a crystal of material characterized by a crystalline vibration that couples with electrons having energies above a particular level in the conduction band, said crystal having parallel major faces and two minor faces disposed to have their surface normals forming with the surface normals of said major surface angles that are greater than the internal reflection angle for said crystal, means for applying a magnetic field to said crystal to provide a plurality of cyclotron energy levels below said particular level, and means for applying to said crystal pumping radiation that selectively populates a first cyclotron energy level next below said particular level to establish a population inversion between said first level and a second cyclotron energy level next below said first level, whereby said stimulated emission of radiation is enabled.

5. Apparatus according to claim 4 in which the minor faces have transmissivity and spacing that establish a gain appropriate for unsaturated amplification of a stimulating radiation admitted through one of said minor faces and having an intensity above the level of background noise, said stimulating radiation having a photon energy substantially equal to the spacing between the first cyclotron energy level next below the particular level and the second cyclotron energy level next below said first cyclotron energy level.

6. Apparatus for the stimulated emission of radiation, comprising a material characterized by a crystalline lattice that absorbs energy from electrons having energies higher than an energy $E_o$ above the minimum energy of an electron in the conduction band of the material, the valence band of said material being bounded by an energy $E_g$ below said minimum energy, means for applying a magnetic field to said material to establish cyclotron energy levels for the electrons in said conduction band, the energy spacing, $h \cdot \nu$, of said cyclotron energy levels being substantially proportional to the strength of said magnetic field, where $h$ is Planck's constant and $\nu$ is the frequency of the stimulated radiation, said magnetic field having a strength permitting at least two cyclotron energy levels below the level of said crystalline lattice vibration, and means for applying to said crystal pumping photon energy that is greater than $E_g + n \cdot E_o - h \cdot \nu$ and less than $E_g + n \cdot E_o$, where $n$ is any positive integer.

7. Apparatus according to claim 6 in which $n=1$, whereby electrons are excited primarily from the heavy hole level in the valence band to establish a population inversion in the conduction band below the level of the crystalline lattice vibration.

8. Apparatus according to claim 6 in which the material is InSb and the wavelength of the pumping energy is between $4.60\mu$ and $4.94\mu$.

No references cited.

ROY LAKE, *Primary Examiner.*

D. R. HOSTETTER, *Assistant Examiner.*